(12) United States Patent
Shafer

(10) Patent No.: US 9,908,488 B2
(45) Date of Patent: Mar. 6, 2018

(54) WIRELESS ELECTRICAL INTERFACE SYSTEM

(71) Applicant: Jessie James Shafer, Wichita, KS (US)

(72) Inventor: Jessie James Shafer, Wichita, KS (US)

(73) Assignee: Jessie James Shafer, Johnston, IA (US)

( * ) Notice: Subject to any disclaimer, the term of this patent is extended or adjusted under 35 U.S.C. 154(b) by 142 days.

(21) Appl. No.: 15/092,614

(22) Filed: Apr. 7, 2016

(65) Prior Publication Data

US 2016/0288741 A1 Oct. 6, 2016

Related U.S. Application Data

(60) Provisional application No. 62/143,693, filed on Apr. 6, 2015.

(51) Int. Cl.
*B60R 16/023* (2006.01)

(52) U.S. Cl.
CPC .................. *B60R 16/0231* (2013.01)

(58) Field of Classification Search
CPC . B60R 16/0231; B60R 25/00; B60R 16/0239; B60K 26/02
USPC ............................................ 701/1–2; 705/30
See application file for complete search history.

(56) References Cited

U.S. PATENT DOCUMENTS

| 7,363,129 | B1* | 4/2008 | Barnicle | G08C 17/02 701/1 |
| 2008/0106390 | A1* | 5/2008 | White | B60K 26/02 340/426.11 |
| 2008/0132270 | A1* | 6/2008 | Basir | B60W 50/045 455/550.1 |
| 2010/0012417 | A1* | 1/2010 | Walter | B60K 28/063 180/272 |
| 2010/0063904 | A1* | 3/2010 | Ronen | G01C 21/26 705/30 |
| 2011/0227709 | A1* | 9/2011 | Story | B60R 25/102 340/10.42 |
| 2016/0341962 | A1* | 11/2016 | Amaru | G02B 27/0149 |
| 2017/0101006 | A1* | 4/2017 | DeVries | B60R 25/00 |

* cited by examiner

*Primary Examiner* — Albert K Wong

(57) ABSTRACT

The invention comprises a wireless electrical interface system and method for establishing a non-intrusive interface with the vehicle's electrical subsystems required for the operation of an aftermarket electrical device, such as an Ignition Interlock Device (IID) or a GPS tracking device with integrated immobilizer technology. Said non-intrusive interface is established through utilizing engineered connectors for electrical connections to the vehicle's electrical system, and by incorporating wireless interface technology to establish a wireless electrical interface between the vehicle's electrical subsystems accessible only within the passenger compartment and the vehicle's electrical subsystems accessible only within the engine/trunk compartment, eliminating the conventional hardwired electrical interface between aftermarket electrical devices and the vehicle's electrical system.

11 Claims, 8 Drawing Sheets

Wireless Electrical Interface System

Wireless Electrical Interface System

Block Diagram of IIM Interface

Block Diagram of EIM Interface

Simplified Block Diagram of IIM

Simplified Block Diagram of EIM

Flowchart of Vehicle Ignition Interface Between IIM & EIM

Flowchart of IID Immobilizer System Interface Between IIM & EIM

Flowchart of Vehicle's Auxiliary Electrical System Interface

WIRELESS ELECTRICAL INTERFACE SYSTEM

CROSS-REFERENCE TO RELATED APPLICATIONS

This application is related to and claims priority to U.S. Provisional Application No. 62/143,693, entitled "Wireless Electrical Interface Module" (Shafer) filed Apr. 6, 2015.

FIELD OF INVENTION

The invention relates to a wireless electrical interface system which establishes an interface between aftermarket electrical devices and a vehicle's electrical system. More specifically, the invention establishes a wireless electrical interface between the vehicle's electrical subsystems accessible only within the passenger compartment and the vehicle's electrical subsystems accessible only within the engine/trunk compartment, replacing the conventional hardwired electrical interface between aftermarket electrical device and the vehicle.

BACKGROUND OF THE INVENTION

The interface between a vehicle's electrical system and aftermarket electrical devices require hardwired installation methods performed by $3^{rd}$ party installers. An example is the requirement for aftermarket Ignition Interlock Devices (IIDs) to interface with the following vehicle's electrical subsystems: (1) the battery system, (2) the ignition system, (3) the starter system, (4) the horn system, and (5) the lighting system. Currently, to achieve the interface the $3^{rd}$ party installer must hardwire said IIDs into said vehicle's electrical subsystems, which generally requires modifications to the OEM's electrical and, or structural design of the vehicle. Examples of IIDs include but are not limited to Breath Alcohol Ignition Interlock Devices (BAIIDs) and GPS tracking devices having an immobilizer system.

As stated, aftermarket electrical devices requiring an interface with multiple vehicle electrical subsystems, typically requires $3^{rd}$ party installers to hardwire the device into the vehicle's electrical wiring system. The hardwired method typically includes but is not limited to: (1) probing of the vehicle's electrical wiring system to locate the correct electric subsystem circuit, within a wire loom, required by the aftermarket electrical device, (2) splicing into various vehicle electrical subsystems for interfacing with the aftermarket electrical device, (3) modifying the wiring of the vehicle's starter subsystem for connecting to the immobilizer circuit of the aftermarket electrical device, (4) altering and/or damaging the vehicle's firewall for access to the required electrical subsystem(s) within the vehicle's engine/trunk compartments, (5) stripping and terminating multiple electrical conductors for electrical connections to required electrical subsystems, and (6) routing additional aftermarket electrical wiring throughout the vehicle for electrical connections between the vehicle and the aftermarket electrical device. Although the conventional hardwiring method establishes an interface between an aftermarket electrical device and the required vehicle's electrical subsystems, recent advancements in the design of the overall vehicle's electrical system, significantly increases the complexity of each electrical subsystem and vastly impacts the hardwired method, encouraging the use of alternative methods.

Examples of advancements in the design of a vehicle's electrical system, significantly impacting the hardwired method by increasing the complexity of each electrical subsystem, include but is not limited to: (1) the introduction of solid-state devices within the vehicle's electrical subsystems, (2) the introduction of factory installed remote starting systems, (3) the introduction of factory installed push-button ignition systems, (4) the introduction of key ignition systems using pulse width modulation, and (4) the introduction of totally integrated fuse and relay power centers. Improvements in microcontroller (MCU) technology specifically designed for automotive and industrial applications is the primary reason for these advancements. These breakthroughs have allowed vehicle manufacturers to improve the electrical system, by using Pulse Width Modulation (PWM). PWM is a technique for getting analog results by digital means.

The significance of MCU improvements is aftermarket electrical devices designed to interface with a vehicle's analog, 12-volt, electrical subsystems and are not currently capable of interfacing with the vehicle's PWM, 5-volt, electrical subsystems. Thus, the hardwired method is required to establish the required interface between the aftermarket electrical devices and the vehicle's electrical system, requiring modifications to the OEM wiring system of various electrical subsystems and/or modifications to the vehicle's firewall and/or body. The firewall is a primary safety structure preventing smoke and, or fire entering the vehicle's passenger compartment from the engine compartment.

U.S. Pat. No. US20140229061 (Tarnutzer and Prohaszka) discloses a control module relating to a CAN based vehicle immobilizer through a processor being capable of immobilizing said CAN bus, and said control module is installed by an aftermarket supplier. In addition, said patent references supplemental patented vehicle interface systems, which are intended to be used by an OEM and are factory installed. Moreover, the referenced control module and systems utilize the vehicle's CAN bus data lines, via the OBD-II system, for input and output (I/O) operations, specifically relating to vehicle immobilization, and are generally designed to withstand the environment of the vehicle's passenger compartment. Consequently, the referenced control module and systems cannot withstand the harsh operating environments of the vehicle's exterior compartments, such as the engine compartment. Finally, vehicle's manufactured before 1996 were not required to be equipped with the OBD-II system. Therefore, vehicles manufactured without the OBD-II system will not communicate with control modules and systems having this communication protocol.

What is needed is a wireless electrical interface system creating a wireless interface between the vehicle's electrical subsystems by using a wireless master/slave piconet between an interior interface module, electrically connected to the vehicle's electrical subsystems which are only accessible within the passenger compartment, and an exterior interface module, electrically connected to the vehicle's electrical subsystems which are only accessible within the engine/trunk compartment, whereby the electrical connections are established at the vehicle's passenger compartment fuse box, the vehicle's OBDII-port, and the vehicle's engine/trunk compartment fuse box, by using a non-intrusive method to electrically connect the interior and exterior interface modules of the wireless electrical interface system to the required electrical subsystems.

What is a needed is a wireless electrical interface system which is installed by a $3^{rd}$ party to eliminate the conventional hardwired method required for aftermarket electrical devices to interface with the vehicle's electrical system, eliminating modifications to the firewall and, or the body of the vehicle, and reducing modifications to the vehicle's electrical system.

What is needed is a wireless electrical interface system which can establish an interface with the vehicle's digital and, or analog electrical subsystems through the non-intrusive electrical connections at the vehicle's fuse boxes and a pass-through electrical connection at the vehicle's OBD-II port, utilizing the OBD-II port to interface with the vehicle's CAN bus network for communication with the vehicle's auxiliary electrical subsystems (i.e. horn and/or lighting system) controlled by the Powertrain Control Module (PCM), Body Control Module (BCM), or other control module.

What is needed is a wireless electrical interface system which can withstand the harsh environment outside of the vehicle's passenger compartment, more specifically, the environment of the vehicle's engine compartment.

SUMMARY OF THE INVENTION

The Wireless Electrical Interface System (WEIS), referred to as the "invention" herein, addresses these needs by means of a wireless electrical interface between a vehicle's electrical system, including all analog and digital electrical subsystems, and aftermarket electrical devices. The WEIS comprises an interior interface module (IIM) and an exterior interface module (EIM).

As used herein interior electrical systems refers to the vehicle's electrical subsystems accessible within the passenger compartment fuse box and/or within the CAN-bus system, and exterior electrical subsystems refers to vehicle's electrical subsystems accessible within the engine/trunk compartment fuse box.

The electrical connections at the vehicle's fuse boxes are established by utilizing non-intrusive, engineered, add-a-circuit fuses inserted into the desired electrical subsystem circuits located within the fuse boxes. Add-a-circuit fuses, also referred to as piggy-back fuses or fuse block extender, enable an aftermarket electrical device to be electrically added to the fuse block within the fuse box without modification to the vehicle's electrical system wiring.

CAN bus, or CAN (Controller Area Network), is a communication protocol utilized by vehicle manufacturers to allow multiple microcontrollers and devices to communicate with each other on a networked bus without a host computer. The present invention utilizes the vehicle's CAN to establish a link between the microcontroller, located within the interior interface module (IIM), and the correct vehicle's electronic control module (ECM) controlling the required auxiliary electrical system required by the aftermarket electrical device. Generally the vehicle's auxiliary electrical subsystems (i.e. horn and lighting systems) are controlled by either the Body Control Module (BCM) or the Powertrain Control Module (PCM).

The present invention utilizes an ultra-low power wireless microcontroller (MCU) integrated with the following multi-standard platforms: Bluetooth Smart, ZigBee RF4CE, and 6LoWPAN. The present invention most commonly utilizes the Bluetooth communication protocol for the wireless connection between the interior and exterior interface module, as Bluetooth is robust, and supports the encrypted, short-range, requirements of the desired wireless connection. The MCU utilizes a dedicated 2.4-GHz Radio Frequency (RF) signal for transmitting and receiving data. Therefore, this invention eliminates the conventional hardwired method and RF interference, while eliminating the requirement to install and route aftermarket electrical wiring through the vehicle's firewall and, or body, by modifying or damaging the integrity of these structures, which diminishes their safety function.

The goal of the present invention is to provide a wireless electrical interface between the vehicle's interior and exterior electrical subsystems, ultimately creating an interface between the wireless electrical interface system (WEIS) and the vehicle's electrical system. Therefore, an interface is established between the aftermarket electrical device and the vehicle's electrical system when the aftermarket electrical device is electrically and/or wirelessly connected to the WEIS. Hence, eliminating the hardwired installation method required by aftermarket electrical devices to interface with the vehicle's electrical system.

The present invention accomplishes the goal by providing a system and a method of establishing an interface between an aftermarket electrical devices and the vehicle's electrical system. The wireless electrical interface system of the present invention electrically and/or wirelessly connects the aftermarket electrical device to the IIM, electrically connects the IIM to the vehicle's interior electrical subsystems, electrically connects the EIM to the vehicle's exterior electrical subsystems, by utilizing non-intrusive electrical connections, and wirelessly connects the EIM to the IIM, whereby the wireless electrical interface method of the present invention establishes a wireless interface between the vehicle's interior electrical subsystems and the vehicle's exterior electrical subsystems, eliminating the conventional hardwired interface method. Therefore, the aftermarket electrical device establishes an interface with the vehicle's electrical system by means of the wireless electrical interface system.

While the said invention is susceptible of embodiments in many different forms, there is shown in the drawings and will herein be described an example of the invention. The presently preferred embodiment of the present invention is explained in the following detailed description with supporting drawings and by way of an example which provides a concise understanding of the said invention. It is not intended to limit the broad aspect of the invention to the illustrated embodiments. So it is to be understood that the same or equivalent functions and sequences may be accomplished by different embodiments that are also intended to be encompassed with the spirit and scope of the invention.

DETAILED DESCRIPTION OF THE PREFERRED EMODIMENT

Figure 1:
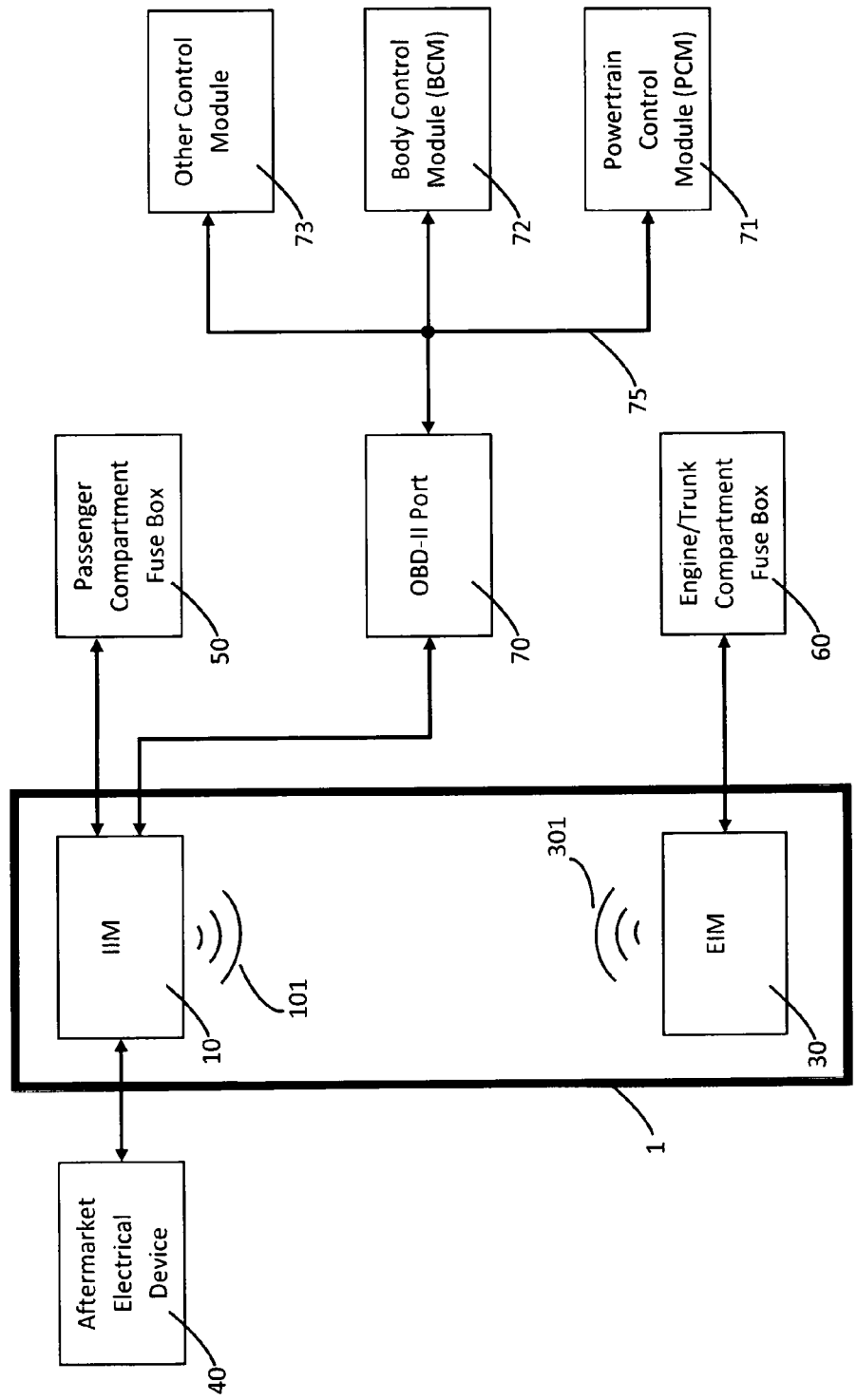
FIG. 1 discloses the wireless electrical interface system of the present invention comprised of the interior interface module in conjunction with the passenger compartment fuse box, CAN bus system via the OBD-II port, and various electronic control modules, and comprised of the exterior interface module in conjunction with the engine/trunk compartment fuse box.

Reference is now made to FIG. 1, which illustrates, in simplified form, the primary connections for the preferred embodiment of the wireless electrical interface system (WEIS) 1. The WEIS 1 is comprised of an interior interface module (IIM) 10 and an exterior interface module (EIM) 30.

The IIM 10 is wirelessly and, or electrically connected to an aftermarket electrical device 40, and electrically connected to the vehicle's passenger compartment fuse box 50 and OBD-II port 70. The OBD-II port 70 is electrically connected to the vehicle's CAN-bus 75, and establishes an electrical interface between the IIM's 10 CAN transceiver 104 and the required vehicle's electronic control modules (i.e. Powertrain Control Module (PCM) 71, Body Control Module (BCM) 72, and other Electronic Control Modules 73). The EIM 30 is electrically connected to the vehicle's engine/trunk compartment fuse box 60. The IIM 10 and the EIM 30 are connected to vehicle's electrical subsystems after the above electrical connections are established. To establish the interface between the IIM 10 and the entire vehicle's electrical system a wireless connection must be established between the IIM 10 and the EIM 30, the establish connection illuminates LED 123 located within the IIM 10 circuit and LED 323 located within the EIM 30 circuit providing a visual confirmation to the user a wireless connection has been established. Whereas, the IIM 10 combines its electrical connections to the vehicle's interior electrical subsystems with the electrical connections established by the EIM 30 to the vehicle's exterior subsystems, to form the overall vehicle's electrical system. A specific wireless configuration is used between the IIM 10 and the EIM 30 to combine the interior and exterior electrical subsystems, to form the vehicle's electrical system. The specific wireless configuration is a master/slave piconet, a brief explanation of the wireless configuration is explained below.

A master/slave piconet is formed when two or more devices connect where one wireless device is configured as the master, and one or more devices are configured as slave(s). The master device broadcasts a unique, password encrypted, identifier which is discoverable by only slave devices. The master device establishes unidirectional control over the slave devices within the piconet and coordinates communication throughout the piconet. The slave device communicates with the master device, and cannot communicate with other slave devices within the piconet. Whereby, said master/slave piconet is established by using a Bluetooth or ZigBee wireless communication protocol. These protocols are integrated within the IIM's wireless microcontroller 101 and within the EIM's wireless microcontroller 301. The IIM's wireless microcontroller 101 is configured as the master device and the EIM's wireless microcontroller 301 is configured as the slave device. Optionally, the aftermarket electrical device 40 must be configured as a slave device to communicate with piconet of the present invention.

For a more complete understanding of the preferred embodiment of the wireless electrical interface system 1 of the present invention, an example utilizing a specific aftermarket electrical device 40 will be presented. The specific aftermarket electrical device 40 is an ignition interlock device (IID), more specifically, a breathe alcohol ignition interlock device (BAIID) with a starter immobilizer circuit. As used herein BAIID or IID refers to the aftermarket electrical device 40. An electrical connection will be used within the example to establish an interface between the BAIID 40 and the IIM 10. Typically BAIIDs are electrically connected to the vehicle. Therefore, it is not necessary to configure the BAIID as a slave device as it is not capable of connecting to the wireless piconet. However, the preferred embodiment of the IIM's 10 electronic circuit is capable of establishing a wireless interface with an aftermarket electrical device having wireless capabilities. A detailed explanation of the configuration of the wireless system of the present invention is presented above.

A brief explanation of the required vehicle's electrical subsystems for the IID 40 are explained herein. Typically, the IID 40 requires access to the following electrical subsystems of a vehicle: (1) battery system, (2) ignition system, (3) starter system, (4) ground system, (5) horn system, and, or (6) lighting system. The battery system applies a constant voltage to the IID 40. The ignition system applies a constant voltage to the IID 40 when the ignition switch of the vehicle is turned to the on position and removes the constant voltage when the ignition switch is turned to the off position. The immobilizer circuit of the IID 40 communicates with the vehicle's starter system to enable and disable the start function of the vehicle. Finally, the IID 40 optionally requires access to the vehicle's auxiliary electrical systems, generally the horn system and, or lighting system, to activate and deactivate the system(s) during predetermined events.

Reference is now made to FIGS. 2-5, which illustrates, in simplified form, the required connections of the preferred embodiment of the present invention to establish an interface between an IID and a vehicle's electrical system, whereas the required connections are explained herein.

Figure 2:
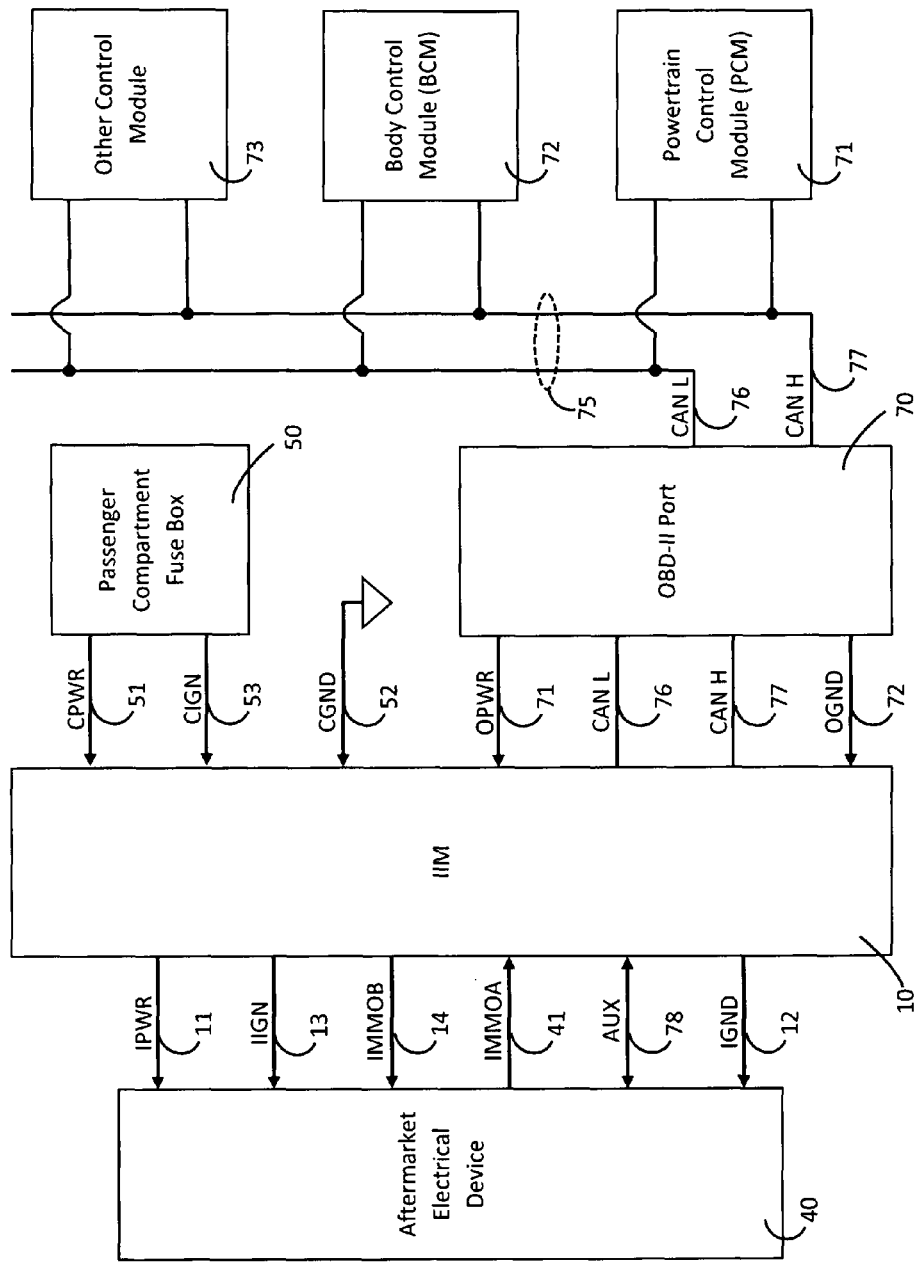
FIG. 2 discloses a detailed block diagram of the present invention of the electrical connections between the aftermarket electrical device and the interior interface module (IIM), and the electrical connections between IIM and the vehicle.
Figure 4:
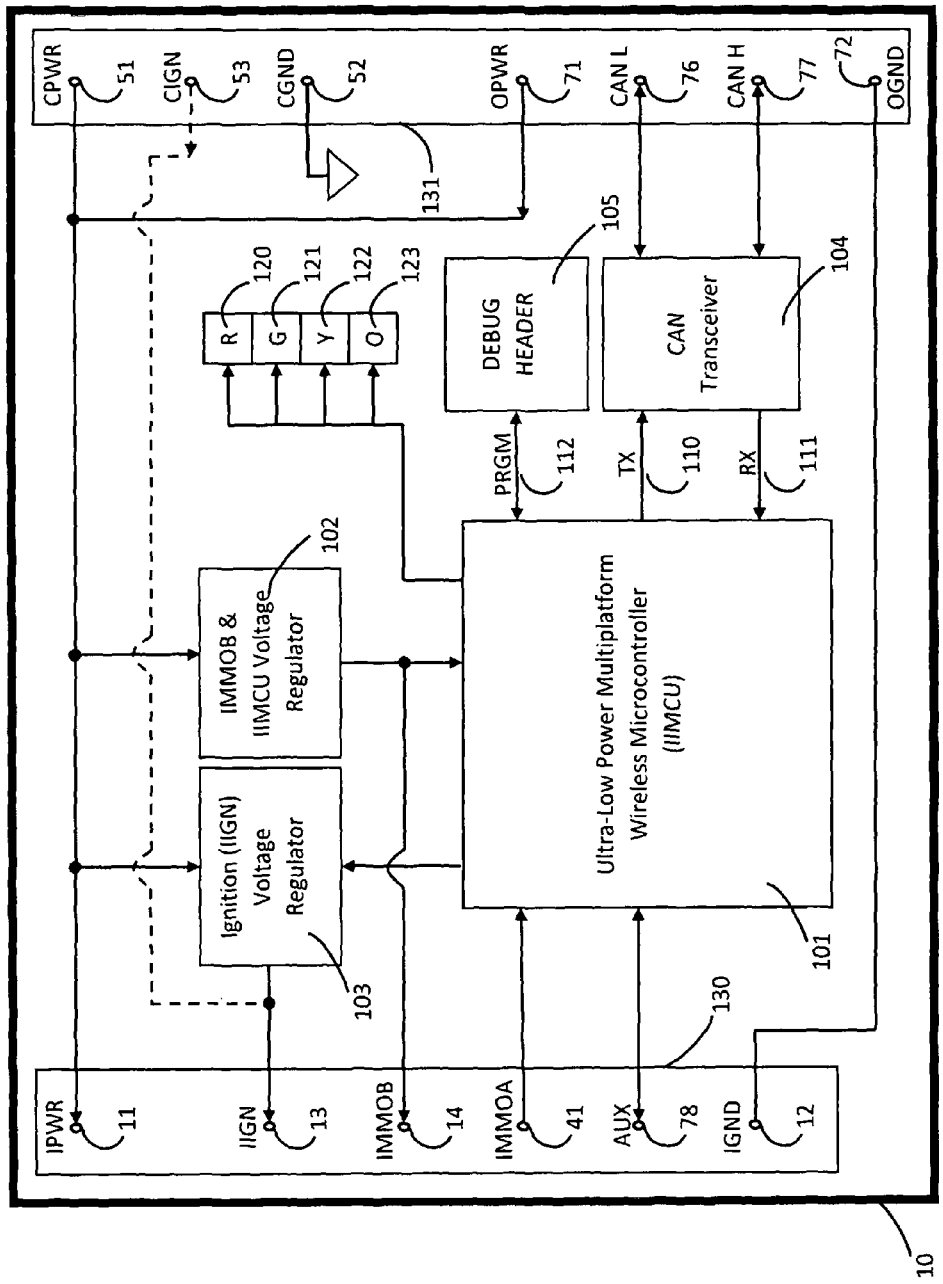
FIG. 4 discloses a block diagram of a simplified schematic of the preferred embodiment of the interior interface module (IIM) of the present invention.

FIG. 2 illustrates a block diagram of the simplified electrical connections between the IIM 10 and the IID 40, between the IIM and the passenger compartment fuse box 50, and between the IIM 10 and the vehicle's OBD-II port. FIG. 4 illustrates, in simplified form, a block diagram of the schematic of the IIM's 10 electronic circuit disposed between IIM terminal block 130 and IIM terminal block 131.

To establish an interface between the illustrated preferred embodiment of the IIM 10 and vehicle's passenger compartment fuse box 50 an automotive grade insulated multi-conductor electrical wire is disposed between IIM terminal block 131 and the vehicle's passenger compartment fuse box 50 establishing non-intrusive electrical connections between the IIM's 10 electronic circuit and the vehicle's electrical subsystems accessible within the passenger compartment fuse box 50. The non-intrusive electrical connections are established by terminating each conductor with a piggy-back fuse and then inserting the piggy-back fuses into the vehicle's passenger compartment fuse box 50. The electrical subsystems required by the IIM's 10 electronic circuit from the vehicle's passenger compartment fuse box 50 are the battery system electrically connected to the CPWR terminal 51 (illuminating LED 120), and the ignition system electrically connected to the CIGN terminal 53 (illuminating LED 121) at IIM terminal block 131.

An automotive grade insulated multi-conductor electrical OBD-II pass-through cable disposed between IIM terminal block 131 and the vehicle's OBD-II port 70, establishes a non-intrusive electrical connection between the IIM's 10 electronic circuit and the vehicle's OBD-II port 70. The electrical subsystems required by the IIM's 10 electronic circuit from the vehicle's OBD-II port are the battery system electrically connected to the OPWR terminal 71, the optional auxiliary electrical systems (i.e. horn and lighting systems) controlled by the CAN-bus system 75 electrically connected to the CAN L terminal 76 and the CAN H terminal 77, and the ground system electrically connected to the OGND terminal 72, at IIM terminal block 131.

Figure 3:
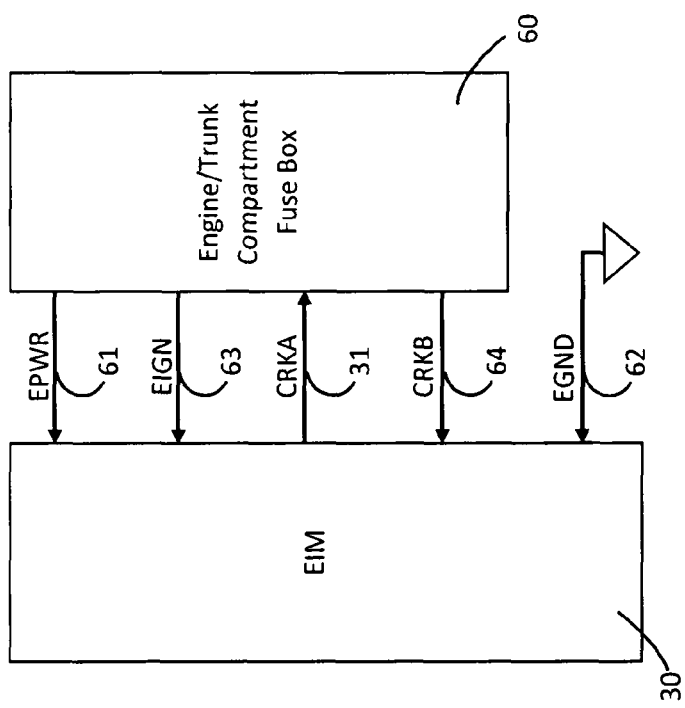
FIG. 3 discloses a detailed block diagram of the present invention of the electrical connections between exterior interface module (EIM) and the vehicle.
Figure 5:
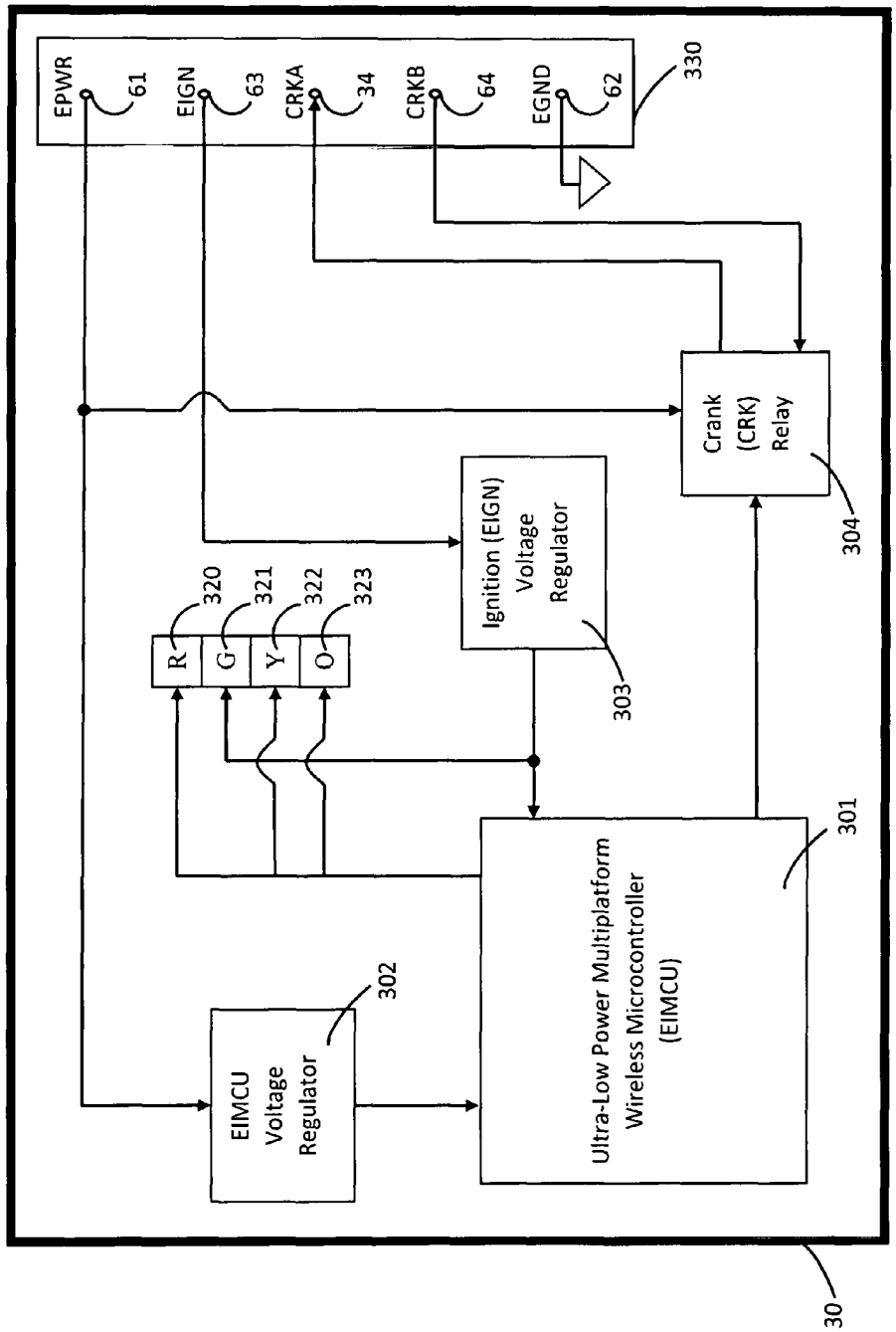
FIG. 5 discloses a block diagram of a simplified schematic of the preferred embodiment of the exterior interface module (EIM) of the present invention.

FIG. 3 illustrates a block diagram of the simplified electrical connections between the EIM 30 and the engine/trunk compartment fuse box 60. FIG. 5 illustrates, in simplified form, a block diagram of the schematic of the EIM's 10 electronic circuit electrically connected to EIM terminal block 330.

An automotive grade insulated multi-conductor electrical wire disposed between EIM terminal block 330 and the vehicle's engine/trunk compartment fuse box 60 establishes non-intrusive electrical connections between the EIM's 30 electronic circuit and the vehicle's electrical subsystems accessible within the engine/trunk compartment fuse box 60. The non-intrusive electrical connections are established by terminating each conductor with a piggy-back fuse and then inserting the piggy-back fuses into the vehicle's engine/trunk compartment fuse box 60. The electrical subsystems required by the EIM's 30 electronic circuit from the vehicle's engine/trunk compartment fuse box 60 are the battery system electrically connected to EPWR terminal 61 (illuminating LED 320), the ignition system electrically connected to EIGN terminal 63 (illuminating LED 321), and the crank (starter) circuit electrically connected to CRKA terminal 34 and CRKB terminal 64, at EIM terminal block 330.

By establishing an electrical connection between the IIM's 10 electronic circuit and the vehicle's passenger compartment fuse box 50, between the IIM's 10 electronic circuit and the vehicle's OBD-II port 70, and between the EIM's 30 electronic circuit and the vehicle's engine/trunk compartment fuse box 60, the IIM 10 and the EIM 30 are now connected to the vehicle's electrical subsystems.

The wireless configuration method stated above is now utilized to establish the required interface between the IIM 10 and the vehicle's electrical system. Therefore, by completing the following declared electrical connections between the IID 40 and the IIM's 10 electronic circuit, as illustrated FIGS. 2 and 4, an interface between the vehicle's electrical system and the IID 40 is established. A preinstalled multi-conductor electrical wire connected to the IID 40 is electrically connected to IIM terminal block 130. The following systems required by the IID 40 are the ground system electrically connected to the IGND terminal 12, the battery system electrically connected to the IPWR terminal 11, the ignition system electrically connected to IIGN terminal 13, the starter immobilizer system electrically connected to IMMOA terminal 41 and IMMOB terminal 14, and the auxiliary electrical systems (i.e. horn and/or lighting system) electrically connected to AUX terminal 78.

Figure 6:
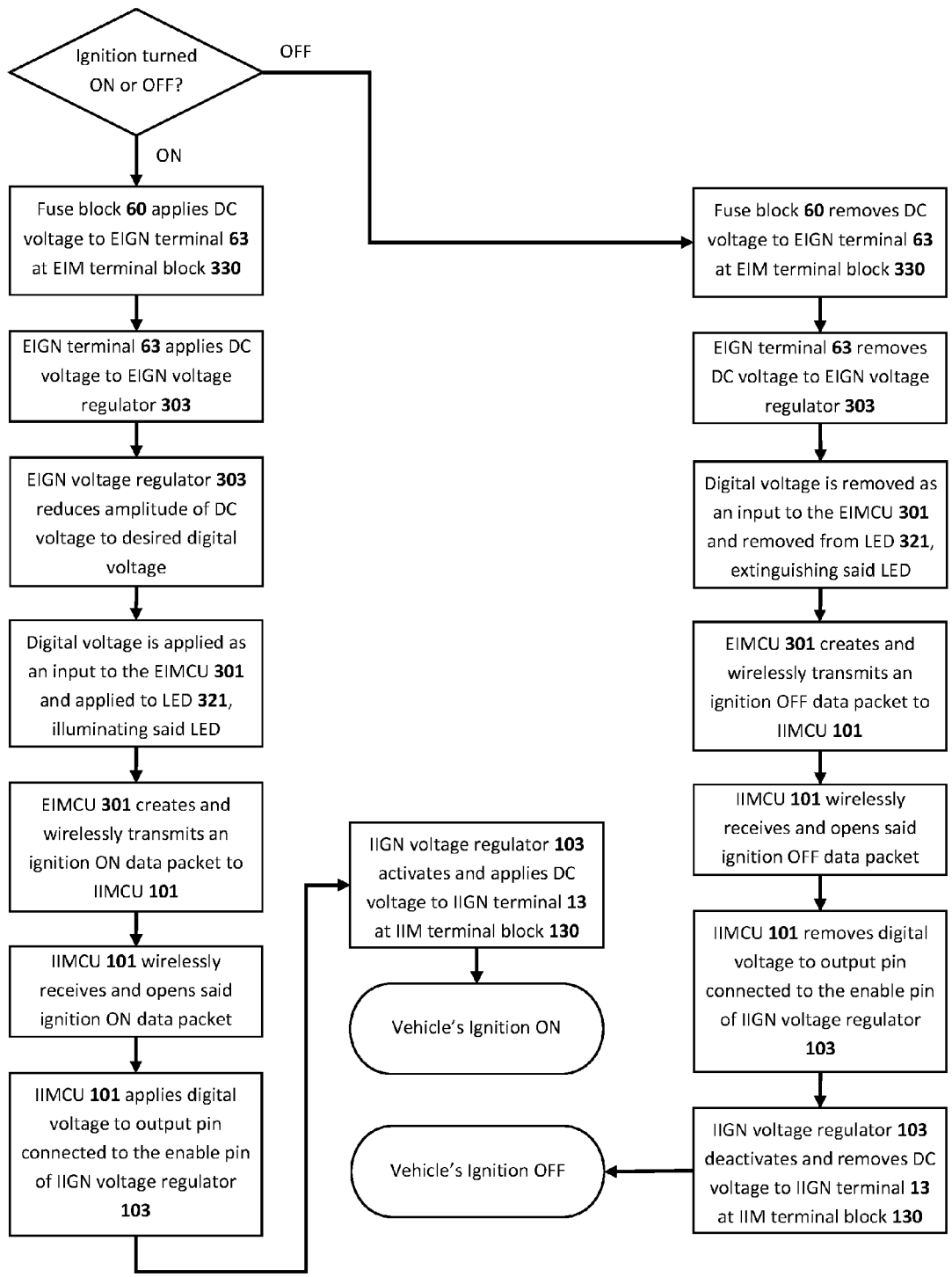
FIG. 6 discloses a flowchart of a simplified process to wirelessly transmit the status of the vehicle's ignition system between the interior interface module (IIM) and the exterior interface module (EIM).
Figure 7:
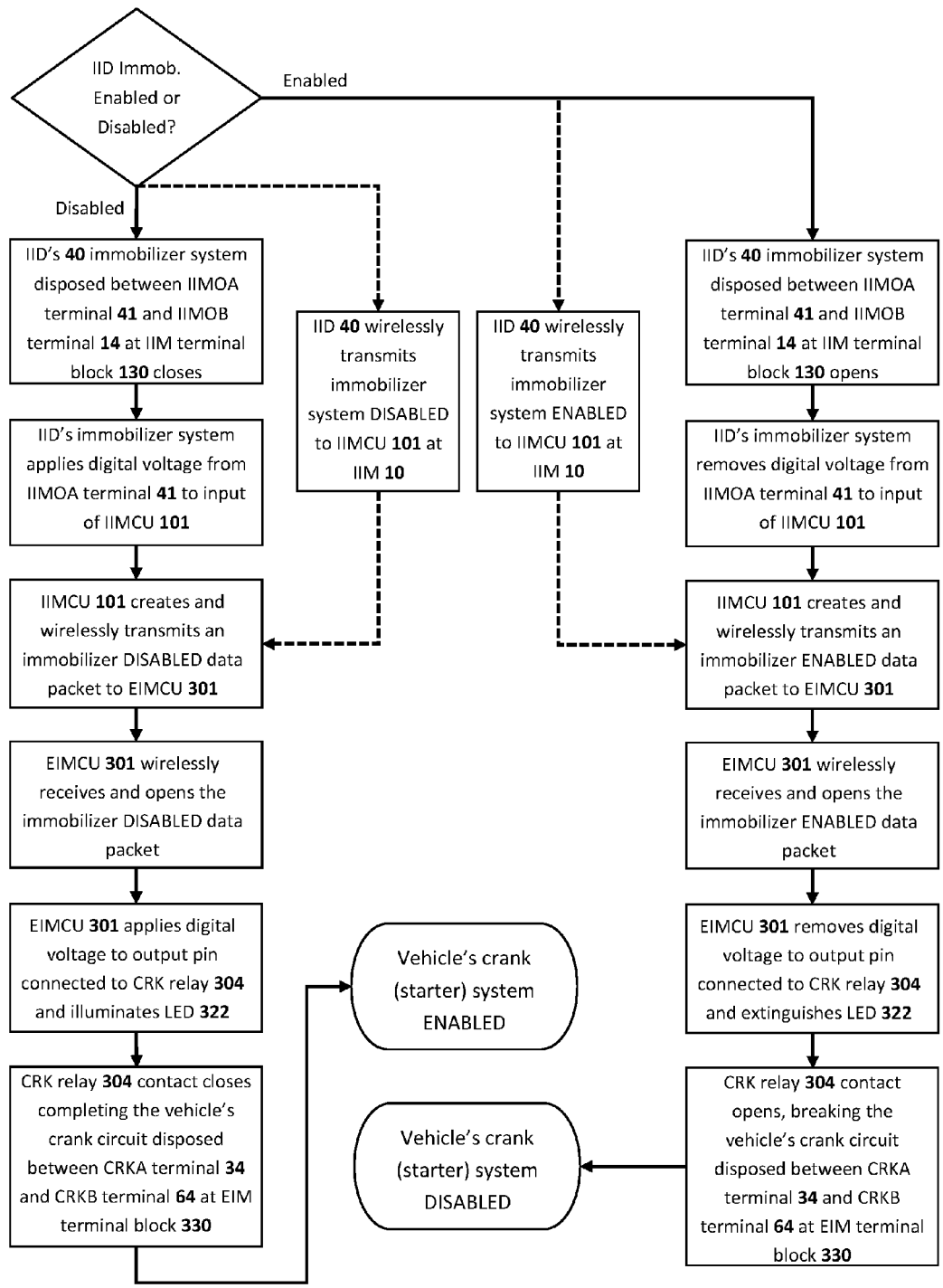
FIG. 7 discloses a flowchart of a simplified process to show an IID immobilizer circuit commanding a vehicle's starter system to be enabled or disabled using the preferred embodiment of the present invention.
Figure 8:
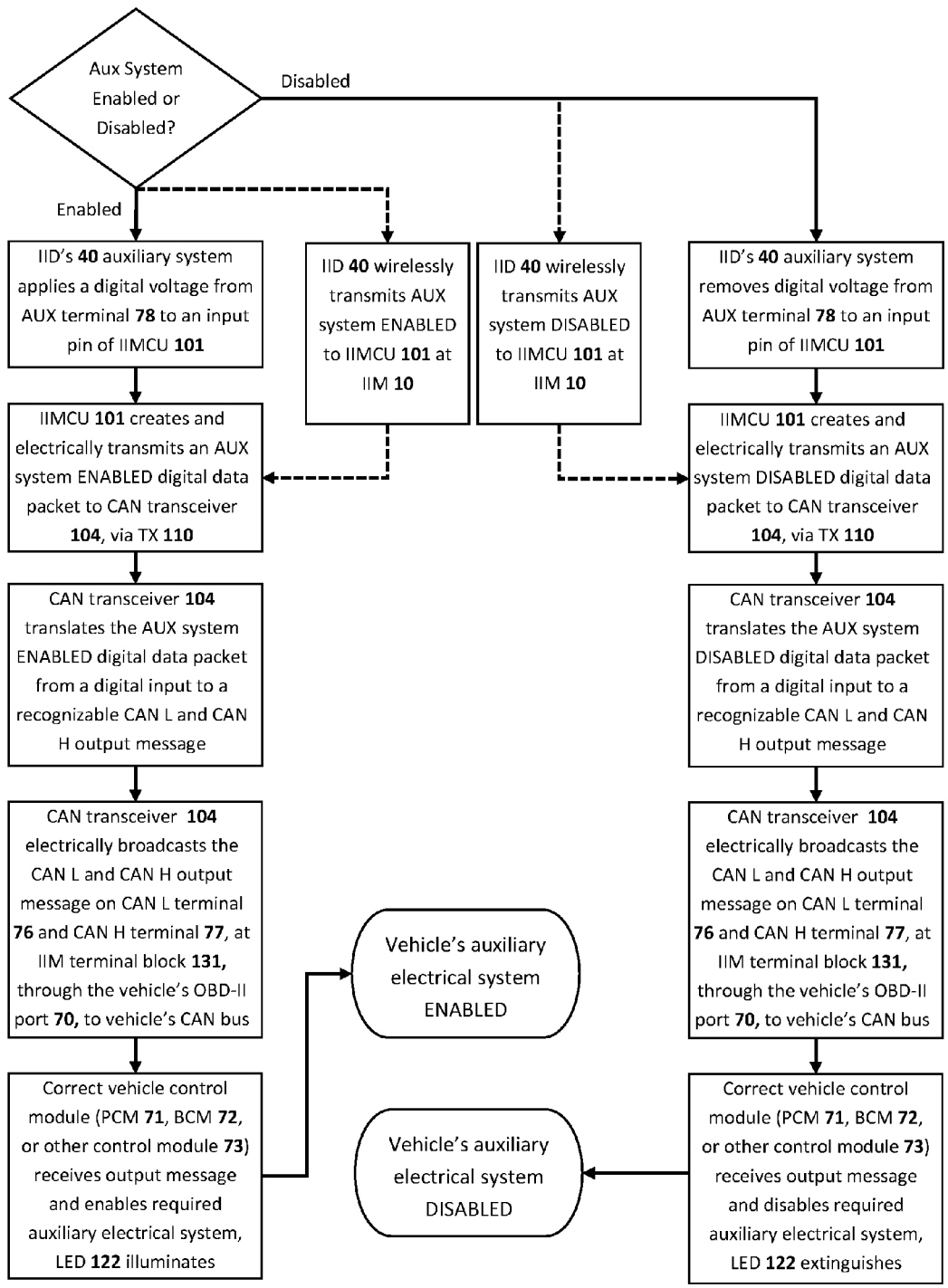
FIG. 8 discloses a flowchart of a simplified process to show an IID commanding a vehicle's auxiliary electrical system (i.e. horn or lighting system) to be enabled or disabled using the preferred embodiment of the present invention.

Reference is now made to FIG. 6-8, which illustrates, in simplified form, the operation of the preferred embodiment of the present invention to establish an interface between an IID and a vehicle's electrical system, whereas the operation is explained herein.

FIG. 6 discloses a flowchart, in simplified form, of the process to wirelessly transmit the status of the vehicle's ignition system between the IIM 10 and the EIM 30. More specifically, the operation explained within the flowchart is the interface between the IIM 10 and the EIM 30 when the vehicle's ignition system is switched from the OFF to the ON position and vice versa. For a more complete understanding the operation of when the ignition switch is turned from the OFF to the ON position is disclosed herein.

Upon the ignition switch being turned from the OFF to the ON position the vehicle's ignition system located at engine/trunk compartment fuse box 60 applies a DC voltage to EIGN terminal 63 at the EIM terminal block 330. The said DC voltage is transferred from the EIGN terminal 63 and applied to the input pin of the EIGN voltage regulator 303. The EIGN voltage regulator 303 is always active, therefore when the DC voltage is applied to the input terminal the EIGN voltage regulator 303 simultaneously reduces the DC voltage to a desired digital voltage between 3.3-Volts and 5-Volts, and outputs the digital voltage to the input pin of the EIM's wireless microcontroller EIMCU 301. In addition, the digital voltage is applied to LED 321, which illuminates to provide visual confirmation to the user of the ignition switch being in the ON position. The EIMCU 301 creates and wirelessly transmits an ignition ON data packet to the wireless microcontroller IIMCU 101, located within the electronic circuit of IIM 10, using the established piconet. IIMCU 101 wirelessly receives the data packet and performs the ignition ON operation by applying a digital voltage to an output pin electrically connected to the enable pin of the IIGN voltage regulator 103 and to an output pin electrically connected to LED 121, LED 121 illuminates providing visual confirmation to the user the ignition switch is ON. The digital voltage activates the IIGN voltage regulator 103, which transfers the DC input voltage applied by the CPWR terminal 51 to the IIGN terminal 13. Therefore, an aftermarket electrical device electrically connected to the IIGN terminal 13 would have a DC ignition voltage applied to its terminals.

FIG. 7 discloses a flowchart, in simplified form, of the process to command a vehicle's starter system to be enabled or disabled by the IID 40 using the preferred embodiment of the present invention. For a more complete understanding the operation of when the IID 40 enables the starter system using the preferred embodiment of the present invention is disclosed herein.

Upon the immobilizer circuit of the IID 40 being disabled, a digital voltage created by the voltage output of the IIMOB & IIMCU voltage regulator 102 used as input power supply to the IIMCU 101 and applied to the IIMOB terminal 14 is applied to the IIMOA terminal 41 upon the IID 40 immobilizer relay closing. The digital voltage is applied to an input pin of the IIMCU 101. Optionally, if the IID 40 has wireless capabilities it can wireless transmit the status of the immobilizer circuit to the IIMCU 101, both connection methods cause the following steps to occur. The IIMCU 101 creates and wirelessly transmits an immobilizer DISABLED data packet to the wireless microcontroller EIMCU 301, located within the electronic circuit of EIM 30, using the established piconet. EIMCU 301 wirelessly receives the data packet and performs the immobilizer DISABLED operation by applying a digital voltage to output pin electrically connected to LED 322 and a digital voltage to an output pin electrically connected to the base of a transistor (not shown), which activates the transistor. LED 322 illuminates providing the user with feedback that the vehicle's crank circuit is enabled. The active transistor applies a ground to one side of the coil of the Crank CRK Relay 304, while a DC voltage is continuously applied to the other side of the coil from EPWR terminal 61. Therefore, the coil within the Crank CRK Relay 304 energizes and its normally open contact closes, which is disposed between CRKA terminal 34 and CRKB terminal 64. Hence, enabling the vehicle's crank circuit at the Engine/Trunk Compartment Fuse Box as the crank circuit is electrically connected between CRKA terminal 34 and CRKB terminal 64.

FIG. 8 discloses a flowchart, in simplified form, of the process to command a vehicle's auxiliary electrical system (i.e. horn or lighting system) to be enabled or disabled by the IID 40 using the preferred embodiment of the present invention. For a more complete understanding the operation of when the IID 40 enables the auxiliary electrical system using the preferred embodiment of the present invention is disclosed herein.

Upon the auxiliary electrical circuit of the IID 40 being enabled, a digital voltage is applied to an input pin of the IIMCU 101 from the AUX terminal 78 electrically connected to the IID 40. Optionally, if the IID 40 has wireless capabilities the AUX enable signal can wirelessly transmitted to the IIMCU 101, both connection methods cause the following steps to occur. The IIMCU 101 creates and electrically transmits a digital PWM signal, referred to as the AUX electrical system ENABLED data packet, to the input of the CAN transceiver 104, via the Tx electrical connection 110. The CAN transceiver 104 translates the digital signal into a recognizable CAN L and CAN H output message to be electrically broadcasted over the vehicle's CAN network. The output message is transmitted from the output CAN terminals of the CAN receiver 104 to the CAN L terminal 76 and the CAN H terminal 77, at IIM terminal block 131. The electrical connection between the IIM 10 and the OBD-II port 70 establishes the link for the output message to be broadcasted over the vehicle's CAN network using PWM. The correct ECM enables the required auxiliary electrical system by the IID 40. The IIM's 10 debug header 105 is utilized to program vehicle specific CAN information into the memory of the IIMCU 101, such that the PWM of the broadcasted message is recognized and received by the correct vehicle's electronic control module (ECM), typically the PCM or BCM controls the required vehicle auxiliary electrical systems (i.e. horn and lighting systems).

Furthermore, the CAN transceiver 104 utilizes the following to transmit a digital signal confirmation to the IIMCU 101 via the Rx electrical connection 111 indicating the auxiliary electrical system has been enabled. The CAN transceiver locates the broadcasted messages on the vehicle's CAN network indicating the required auxiliary electrical system is enabled, via the OBD-II port 70, and creates a digital PWM signal to be transmitted to the Rx input pin of the IIMCU 101, via the Rx electrical connection 111. Upon receiving confirmation the IMCU 101 applies a digital voltage to an output pin electrically connected to LED 122, which illuminates LED 122 providing the user with feedback that the vehicle's auxiliary electrical system is enabled.

With advancements within the automobile industry, specifically within the electrical system design of automobiles, there exists a need to provide users with an invention with design capabilities to establish a wireless electrical interface between an automobile's analog and digital electrical systems and aftermarket electrical devices. The invention described herein provides the solution. The wireless electrical interface system provides seamless integration between the automobile's electrical systems and aftermarket electrical devices. The robust design futures of the apparatus eliminates the hardwired method and establishes a safer, easier, and quicker wireless electrical interface between an automobile's electrical systems and aftermarket devices.

While the foregoing has described what is considered to be the best mode and/or other examples, it is understood that various modifications may be made therein and that the subject matter disclosed herein may be implemented in various forms and examples, and that they may be applied in numerous other applications, combinations and environments, only some of which have been described herein. Those of ordinary skill in that art will recognize that the disclosed aspects may be altered or amended without departing from the true spirit and scope of the subject matter. Therefore, the subject matter is not limited to the specific details, exhibits and illustrated examples in this description. It is intended to protect any and all modifications and variations that fall within the true scope of the advantageous concepts disclosed herein.

What is claimed is:

1. A vehicle interface system for connecting aftermarket electronic devices to a vehicle's electrical system, comprising:
   a master control module directly connected to a vehicle's ODBII port for transferring information and commands between a first aftermarket device and the vehicle's control system; and
   at least one slave control module wherein each slave control module is directly connected to the vehicle's electrical system through a corresponding fuse box for controlling electrical devices within the vehicle by commands, from a second aftermarket device, received through the master control module, and for communicating with the master control module,
   wherein the master and the at least one slave modules are in wireless communication such that the master module controls the slave module and forms a pico net.

2. The vehicle interface system of claim 1, wherein the aftermarket device is a breath alcohol ignition interlock device or a GPS tracking device with immobilizer circuit.

3. The vehicle interface system of claim 1, wherein the wireless communication between the master and slave modules uses a Bluetooth or ZigBee communications protocol.

4. The vehicle interface system of claim 1, wherein the master control module further comprises a terminal block for connecting to the first aftermarket electrical device.

5. The vehicle interface system of claim 1, wherein the master control module further comprises a wireless microprocessor for wireless communication with the first aftermarket electrical device.

6. The vehicle interface system of claim 1, wherein the master control module further comprises a connection to the vehicle's electrical system through a direct connection to a fuse box not connected to a slave control module.

7. The vehicle interface system of claim 1, further comprising add-a circuit fuses to connect the slave module to the fuse box.

8. The vehicle interface system of claim 1, wherein the slave module connects to a plurality of fuse connections to form a terminal block.

9. The vehicle interface system of claim 1, wherein the slave control module further comprises a crank enable/disable circuit to control the operation of the engine.

10. The vehicle interface system of claim 1, wherein the slave control module further comprises an ignition status circuit.

11. A method of establishing an interface between an aftermarket electrical device and a vehicle's electrical system, comprising:
- connecting a master control module to the ODBII port of the vehicle;
- connecting at least one slave control module to at least one fuse box in the vehicle;
- establishing a wireless connection between the master control and the slave control module to form a pico net;
- connecting an aftermarket electrical device to the master control module; and
- transferring data and/or commands between the aftermarket device and the master control module and wirelessly relaying the data and/or commands to the slave control module if the data and/or commands are intended for the slave module.

* * * * *